June 20, 1967 J. M. R. ORR 3,326,110
HEATING AND/OR VENTILATING APPARATUS FOR VEHICLES
Filed Aug. 20, 1965 8 Sheets-Sheet 6

INVENTOR:
JAMES MALCOLM ROBERTSON ORR

ATTORNEYS:
Hall, Pollock + Vande Sande

United States Patent Office 3,326,110
Patented June 20, 1967

3,326,110
HEATING AND/OR VENTILATING APPARATUS FOR VEHICLES
James Malcolm Robertson Orr, Witney, England, assignor to S. Smith & Sons (England) Limited, London, England, a British company
Filed Aug. 20, 1965, Ser. No. 481,343
6 Claims. (Cl. 98—2)

This invention relates to heating and/or ventilating apparatus for vehicles of the kind which employ a fan which draws air from the exterior of the vehicle and blows the air into the passenger compartment of the vehicle. The fan is driven by a D.C. electric motor, the energization of which is controlled by a manually operable switch. The air enters the vehicle through an orifice which is commonly disposed to permit air flow through it in a direction opposite to that of the forward motion of the vehicle. When the vehicle is moving forward, the entering airstream possesses velocity pressure and static pressure components which are related to the speed of the vehicle.

According to this invention there is provided heating and/or ventilating apparatus for a vehicle which is of the kind specified and is adapted to be installed in a vehicle so that the forward motion of the vehicle causes air to pass through it and enter the vehicle, wherein the fan is a centrifugal fan having blades shaped so that a change in the static pressure against which the fan works owing to the forward motion of the vehicle does not change significantly the power required to drive the fan.

In one preferred arrangement the blades are substantially radial at their tips and are backwardly curved at their roots.

In another preferred arrangement the blades are backwardly curved at their tips and at their roots, and are more backwardly curved at their roots than at their tips.

Preferably the area of the path between adjacent blades is substantially constant so that air passing between the blades is neither compressed nor expanded.

Preferably the axial ends of the blades are joined to plates which prevent the passage of air between the axial ends of the blades.

Preferably the D.C. motor has a wound armature and permanent magnets providing the magnetic field.

Heating and ventilating apparatus for a vehicle in accordance with this invention will now be described with reference to the accompanying drawings of which:

FIGURES 2a to 2d are sectional elevations of the apparatus showing the air flow through it in various positions of flap valves 18, 29 and 31. (FIGURES 2a to 2d are diagrammatic and the sheet metal partitions shown therein are not completely consistent with those shown in FIGURES 1, 3 and 4.)

FIGURE 5 shows a detail of the apparatus.

Figure 6:
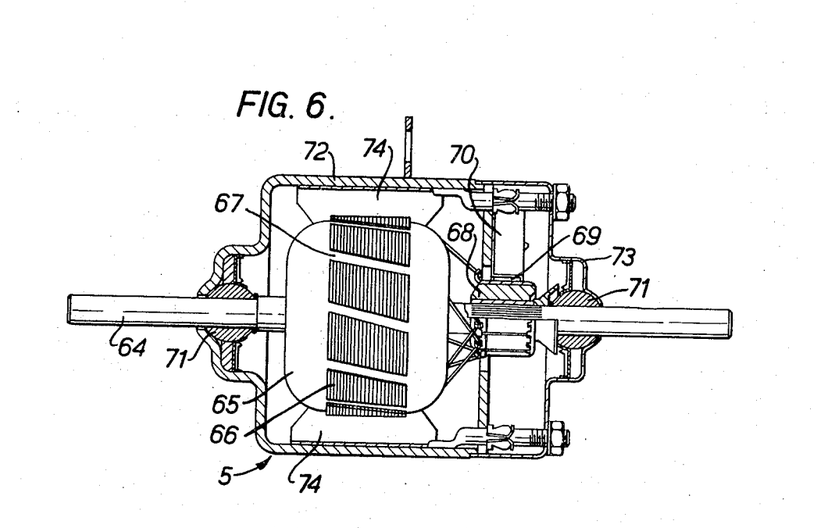
FIGURE 6 is a side elevation, partly in section, of a motor 5.

Referring to FIGURES 1 and 2a to 2d the apparatus has a sheet metal housing 1 (which is subdivided into various compartments by sheet metal partitions). Sheet metal partitions 2 and 3 together with the housing 1 define an air inlet compartment 4. A D.C. motor 5 which drives two centrifugal fans 6 and 7 is disposed within the compartment 4. The fans 6 and 7 which are disposed at opposite ends of the motor 5 are surrounded by a sheet metal volute casing 8. The fans 6 and 7 have backwardly curved blades 60, the blades 60 being backwardly curved at their roots to a greater extent than at their tips as may be seen in FIGURE 7. The axial length of each blade 60 is greater at its tip than its root so that the area of the path between adjacent blades 60 is constant over the whole radial length of the blades 60. Air passing between the blades 60 is therefore neither compressed nor expanded. The ends of the blades 60 distant from the motor 5 are fixed to an annular plate 61 which slopes towards the motor 5 as it extends radially. The ends of the blades 60 adjacent to the motor 5 are joined to an end plate 63 fixed to the shaft of the motor 5. Referring to FIGURE 5, an inlet ring 62 (not shown in FIGURE 1) is disposed adjacent to the eye of each of the fans 6 and 7 and directs the path of the air flowing into the eye. Referring to FIGURE 6 the motor 5 has a shaft 64 which projects from both ends of the motor casing and carries an armature 65. The armature 65 has laminations 66 formed with the slots 67 and windings (not shown) disposed in the slots 67. The ends of the windings are connected to the segments of a commutator 68 which is engaged by two carbon brushes 69 (only one brush can be seen in FIGURE 6). Each brush 69 is carried in a brush holder 70 which is connected to a tag (not shown). The shaft 64 is supported by spherical bearings 71 which are carried by the two parts 72 and 73 of the motor casing. The part 72 of the casing carries permanent magnets 74 which provide the magnetic field of the motor.

Two ports 9 and 10 are provided in the housing 1 which are disposed adjacent to a louvre 11 in the vehicle scuttle. The volute casing 8 terminates adjacent to the ports 9 and 10 so that air can flow through the inlet rings 62 into the eyes of the centrifugal fans 6 and 7. A horizontal sheet metal partition 12 is disposed within the air inlet compartment 4 immediately below the motor 5 and the fans 6 and 7. The partition 12 is provided with two ports 13 and 14 disposed immediately below fans 6 and 7 respectively through which air drawn through the ports 9 and 10 is impelled. The partition 2 also defines with the housing 1 a further compartment 15 in which a conventional radiator matrix 16 is disposed. The matrix 16 is connected by pipes 40 and 41 (FIGURE 3) to the vehicle engine cooling system and in use is filled with hot coolant. An opening 17 in the partition 2 connects the compartment 4 to the compartment 15, and a flap valve 18 controls the flow of air therethrough. The partition 3, which is joined to the partition 2 over part of its length, defines with two vertical sheet metal partitions 21 and 22 a compartment 19. An opening 20 (obscured in FIGURE 1) on the partition 3 connects the compartments 4 and 19. The housing 1 and the partitions 3 and 21 define a compartment 23, and the housing 1 and the partitions 3 and 22 define a compartment 24. (The purpose of the compartments 23 and 24 will be explained later.) The partitions 2 and 3 and an approximately horizontal sheet metal partition 25 define a compartment 26. Openings 27 and 28 in partitions 2 and 3 respectively connect the compartments 15 and 19 to the compartment 26. A double faced flap valve 29 controls the flow of air through the openings 27 and 28. The partition 25 and the housing 1 define a further compartment 30, and an opening 32 in the partition 25 connects the compartments 26 and 30. A flap valve 31 controls the flow of air through the opening 32. Ports 33 in the housing 1 connect the compartment 30 to the passenger compartment of the vehicle. Openings 34 and 35 in the partition 3 connect the compartment 26 to the compartments 24 and 25 respectively which are connected to the windscreen of the vehicle by rubber ducts 36 registering with ports 37 in the housing 1.

Figure 3:
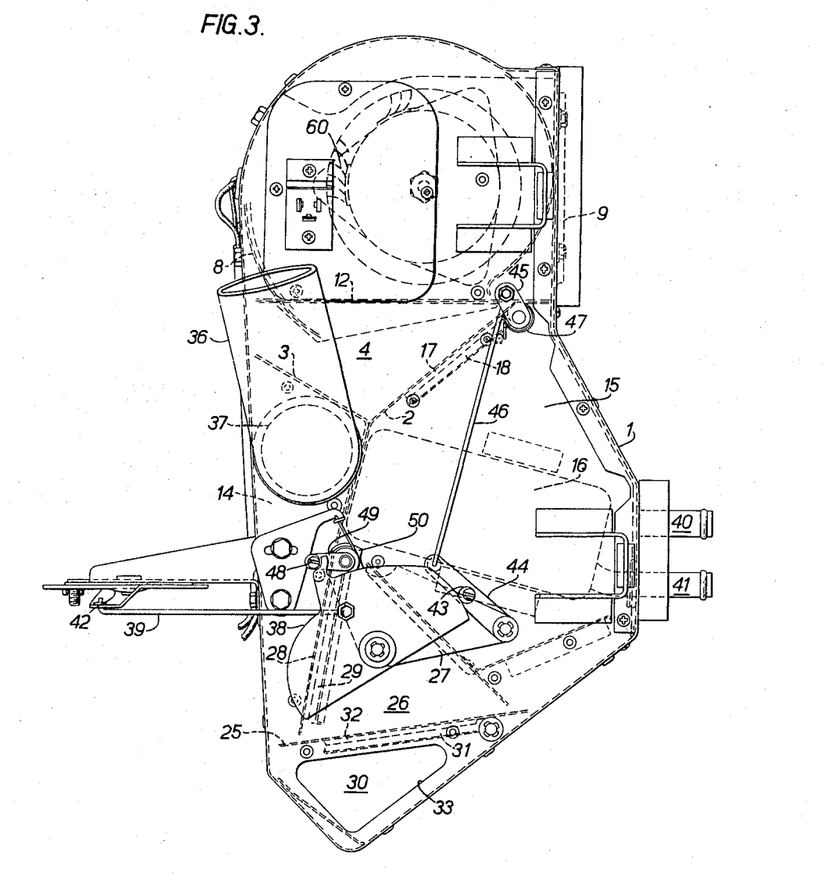
FIGURE 3 is a side elevation of the apparatus in the direction of the arrow III in FIGURE 1.

Referring now to FIGURE 3, the flap valves 18 and 29 are controlled by a cam 38 which is rotatable and is connected by a link 39 to a horizontal rotatable plate 42. The plate 42 is connected to a control device operable by the vehicle driver by a lever (not shown). A cam follower 43 is mounted on a flat link 44 which is connected to a member 45 rotatable with the flap valve 18, by a link 46. A spiral spring 47 urges the flap valve 18 away from the opening 17 and the cam follower 43 into engagement with the cam 18. A cam follower 48 is mounted on a link 49 rotatable with the flap valve 29, and a spiral spring 50 urges the flap valve 29 towards the opening 27 and the cam follower 48 into engagement with the cam 38. The cam 38 is shown in one of the limits of its rotational movement and in this position flap valve 18 closes opening 17 and flap valve 29 closes opening 28. If the cam 38 is rotated in the clockwise direction, initially the flap valve 29 is moved to close opening 27 while the position of flap valve 18 remains unchanged. Further movement of the cam 38 gradually moves flap valve 18 away from opening 17 and gradually moves flap valve 29 away from opening 27 towards opening 28. In the most clockwise position of cam 38, the flap valve 29 closes opening 28.

Figure 4:
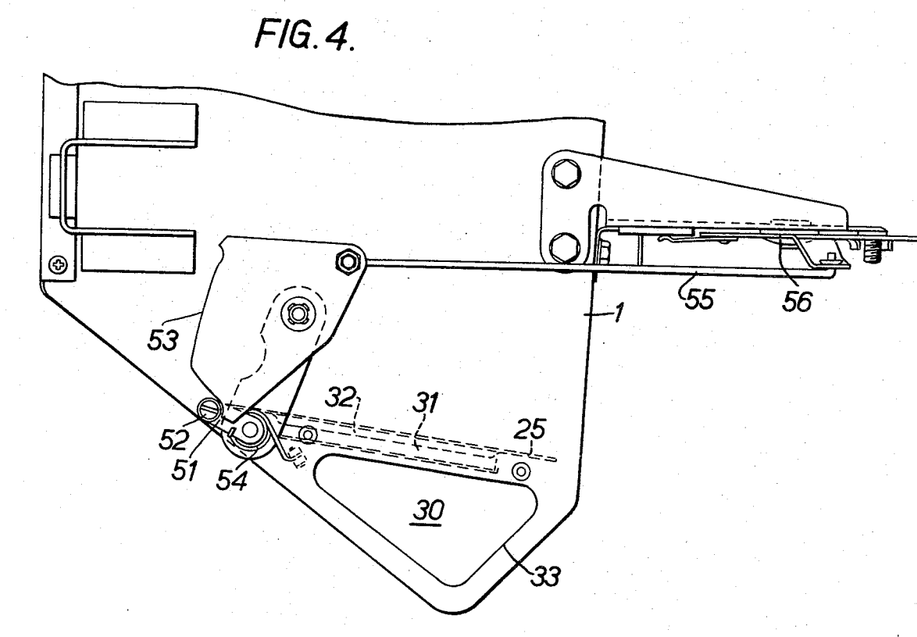
FIGURE 4 is a side elevation of the apparatus in the direction of the arrow IV in FIGURE 1.

Referring now to FIGURE 4 a member 51 is rotatable with flap valve 31 and carries a cam follower 52. The cam follower 52 is urged into engagement with a cam 53 by a spiral spring 54 which thus urges flap valve 31 away from the opening 32. The cam 53 is connected to horizontal rotatable plate 56 by a link 55. The plate 56 is connected to a lever operable by the vehicle driver (not shown). Rotation of the cam 53 from the position shown moves the flap valve 31 away from the opening 32.

The operation of the device will now be described. Air is drawn into the compartment 4 from the exterior of the vehicle by the forward motion of the vehicle and/or by the fans 6 and 7 if the motor 5 is energized. In the positions of the flap valves 18 and 29 shown in FIGURE 3 no air can enter the compartment 15 from the compartment 4 and no air can enter the compartment 26 from the compartment 19. Thus no air can pass to the passenger compartment or the windscreen.

Figure 1:
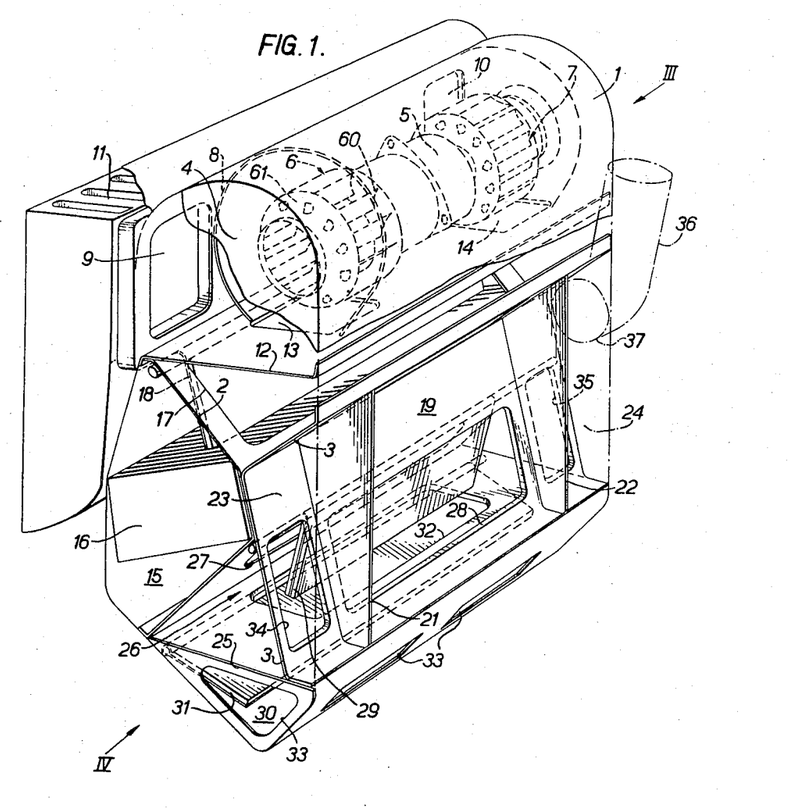
FIGURE 1 is a schematic perspective view of the apparatus.
Figure 2A:
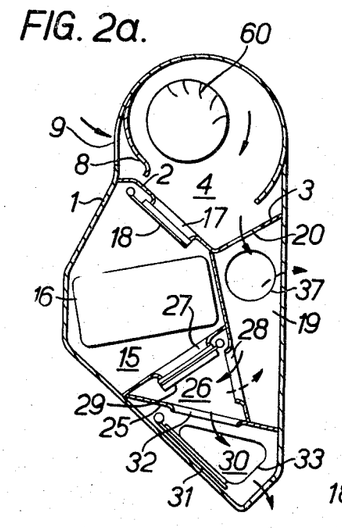

If the cam 38 is rotated sufficiently to move flap valve 29 to the position where it closes opening 27 but not sufficiently to move flap valve 18, and the cam 53 is rotated to move flap valve 31 away from opening 32, the position of the flap valves is that shown in FIGURE 2a. In this condition air is drawn into the compartment 4, from there it flows into the compartment 26 through opening 28 and from there flows to the passenger compartment through the compartment 30 and to the windscreen of the vehicle through the compartments 23 and 24 (as indicated by the dotted arrows in FIGURE 2a). The air is not heated as it cannot enter compartment 15 and come into contact with the matrix 16 through either of the openings 17 and 27 as they are closed by their respective flap valves.

Figure 2B:
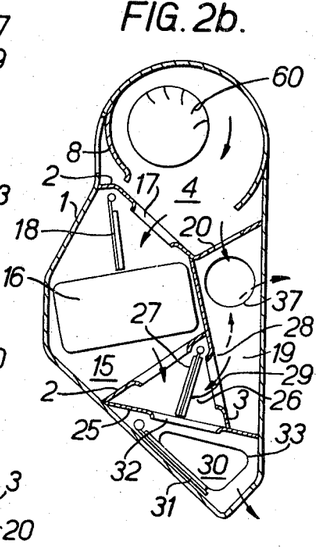

If the cam 38 is rotated further moving flap valve 18 away from opening 17 and moving flap valve 29 to an intermediate position between the openings 27 and 28, the position of the flap valves is that shown in FIGURE 2b. In this condition air flows to the compartment 26 through both of the compartments 15 and 19, the air flowing through the compartment 15 being heated by the matrix 16. The air in the compartment 26 which is at an intermediate temperature flows to the passenger compartment through compartment 30 and the windscreen through compartments 23 and 24 (as indicated by the dotted arrows).

Figure 2C:
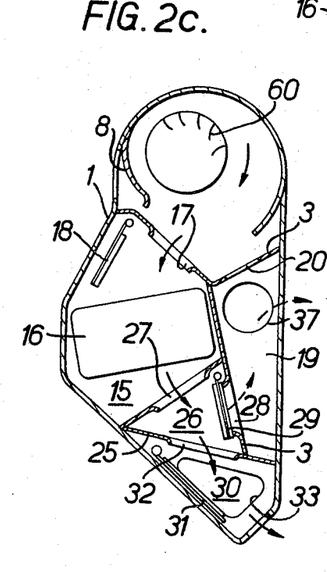

If the cam 38 is further rotated to move the flap valve 29 so as to close opening 28 the position of the flap valves is that shown in FIGURE 2c. Air flows through from compartment 4 to compartment 26 through the compartment 15 alone so that all the air entering compartment 26 is heated. The air flows from the compartment 26 to the passenger compartment through compartment 30 and to the windscreen through compartments 23 and 24 (as indicated by the dotted lines).

Figures 2D, 5:
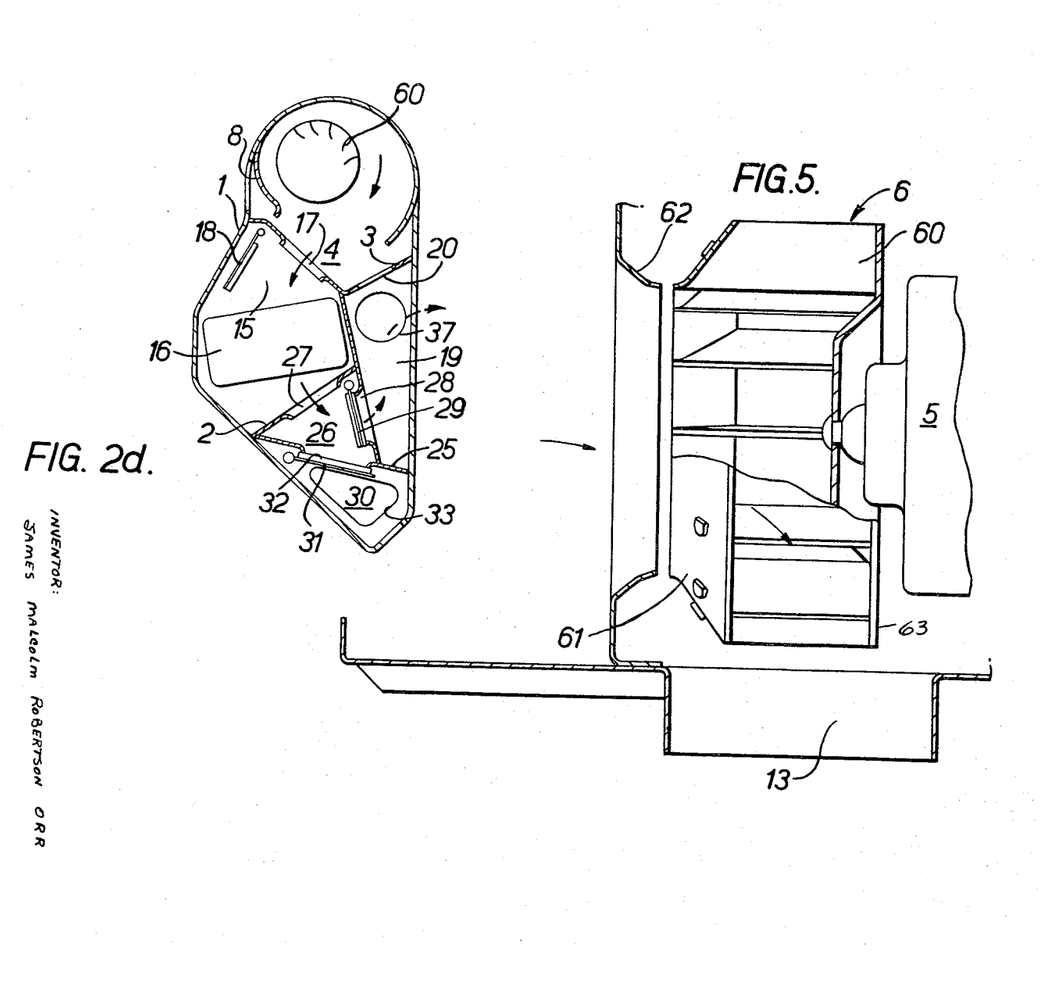

If the cam 53 is rotated to move the flap valve 31 to close the opening 32 the position of the flap valves is that shown in FIGURE 2d. In this condition all the heated air entering compartment 26 flows out through openings 34 and 35 to the compartments 23 and 24 and from there flows to the windscreen.

In a modification the D.C. motor 5 is a conventional D.C. shunt motor.

Figures 7, 8:
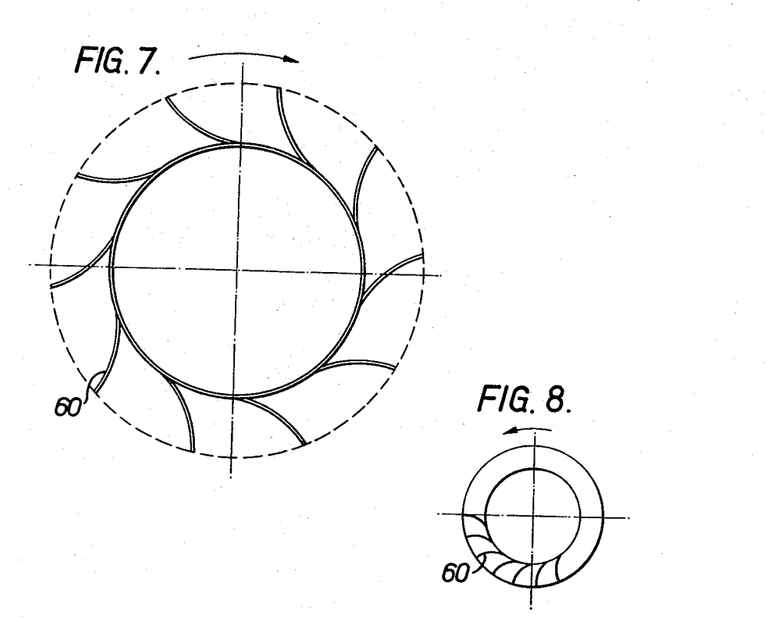
FIGURE 7 shows the shape of blades 60 of a fan 6.
FIGURE 8 shows an alternative shape of the blades 60.

In another modification, the shape of blades 60 is that shown in FIGURE 8 in which the blades are truly radial at their tips with respect to the axis of the fan. This is in distinction to the arrangement of FIGURE 7, wherein the blade tips are nearly radial but are backwardly curved to a small extent.

Figure 9:
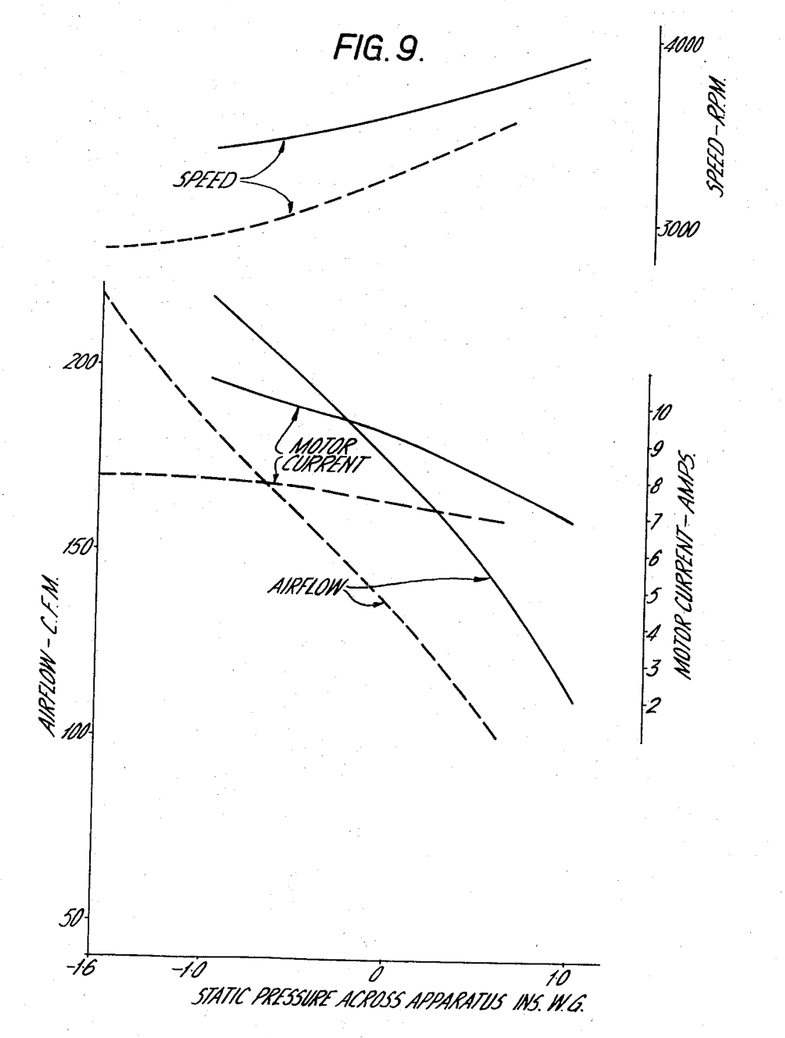
FIGURES 9 and 10 show graphs of speed, airflow and current for two different types of fans when driven by two different types of D.C. motors.

In FIGURE 9 graphs are shown illustrating the air flow through the apparatus, and the speed and the current drain of the motor driving the fans, plotted against static pressure when the fans 6 and 7 are replaced by fans having forwardly curved blades such as those shown in our British Patent No. 997,509. The full lines of FIGURE 9 are those curves applicable when the motor 5 has its field supplied by permanent magnets and the broken lines are those curves applicable when the motor 5 has windings producing its field. The static pressure across the apparatus is, of course positive when the vehicle is stationary but is reduced when the vehicle is moving forwardly and a substantial negative static pressure exists across the apparatus when the vehicle is moving forwardly at high speeds. It will be observed that the motor current (which is a measure of the electrical power supplied to the motor) increases significantly as the magnitude of the positive static pressure decreases, as the static pressure then becomes negative and as the magnitude of the negative static pressure increases. Thus the effect of the forward motion of the vehicle is to increase the current consumption of the heating and ventilating apparatus, the reason for the greater current consumption being that the power requirement of the fans is increased by the change in the static pressure. It will also be noticed that the relative change of current consumption caused by the forward motion of the vehicle is greater when the D.C. motor has permanent magnets providing its magnetic field than when it has windings providing its field. The explanation of this effect will be given later.

Figure 10:
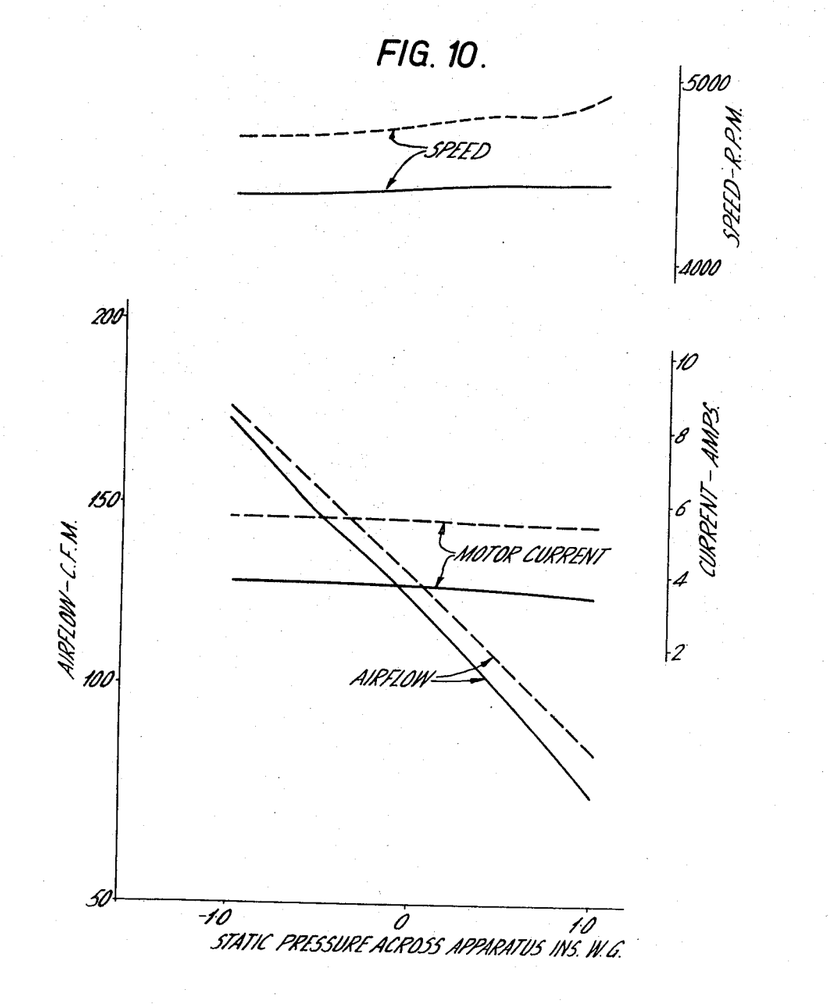

In FIGURE 10 graphs are shown illustrating the airflow, the speed and the current drain plotted against static pressure when the fans 6 and 7 have blades having the shape illustrated in FIGURE 7. The full lines of FIGURE 10 are those applicable when the motor 5 has its field supplied by permanent magnets and the broken lines are those applicable when the motor 5 has windings providing its field. It will be observed that the current consumption of the motor 5 is almost constant and is very little affected by the change in static pressure, the reason being that the power requirement of the fans changes very little with the change in static pressure.

The explanation of the comparatively large change in current consumption of a motor having permanent magnets driving a fan which has forwardly facing blades when the fan experiences a change in static pressure is that the efficiency curve of a motor having permanent magnets has a more pronounced peak than one having field windings. If the motor is operating at its maximum efficiency when the vehicle is stationary (and the static pressure is at a maximum) the effect of the increased power requirement of the fan will be to cause the motor to operate at below its maximum efficiency. Since the efficiency curve of a motor having permanent magnets has a more pronounced peak than one having field windings the effect of working at below maximum efficiency will be more marked.

Having thus described my invention, I claim:

1. Ventilating apparatus for installation in a vehicle, comprising a centrifugal fan disposed within a volute casing having an inlet and an outlet, first duct means connected to said inlet for supplying said fan with air from the exterior of the vehicle upon forward motion of said vehicle, second duct means connected to said outlet for delivering air to the passenger compartment of the vehicle, and motor means for driving said fan, said fan having a plurality of blades each of which has its outermost portion directed in a substantially radial direction with respect to the axis of said fan, the remaining portion of each of said blades being generally inclined at a substantial angle to said outermost substantially radial portion, and the innermost portion of each of said blades leading its outermost portion in the direction of rotation of said fan.

2. The apparatus claimed in claim 1 wherein said motor means comprises a D.C. motor having a wound armature rotatable in a magnetic field provided by permanently magnetized magnetic material.

3. Ventilating apparatus as claimed in claim 2 wherein the axial length of each of said blades is greater at the outermost portion thereof than at the innermost portion thereof.

4. In a vehicle, air moving equipment comprising a centrifugal fan having an air inlet, and duct means connected to said inlet and positioned so that forward motion of said vehicle causes air from the exterior of the vehicle to be forced into said inlet, said fan comprising blades having outermost tip portions which are directed substantially radially with respect to the axis of the fan, the remaining portion of each of said blades being generally inclined at a substantial angle to the outermost tip portion thereof, and each of said blades having an innermost root portion positioned in leading relation to the outermost tip portion thereof in the direction of rotation of said fan.

5. The structure of claim 4 wherein said fan is driven by a D.C. motor having a wound armature which rotates in a magnetic field provided by permanently magnetized magnetic stator means.

6. In a vehicle, heating and ventilating equipment comprising a housing containing a centrifugal fan within a volute casing, a heat exchanger, means defining a passage by-passing said heat exchanger, valve means for controlling flow of air through said heat exchanger or through said by-pass passage, said housing having an air inlet and an air outlet, said fan being arranged to promote air flow from said inlet to said outlet through said heat exchanger or through said by-pass passage, said centrifugal fan having blades whose outermost portion is substantially radial with respect to the axis of the fan, the remaining portion of the blades being generally inclined at a substantial angle to the outermost portion thereof with the innermost portion leading the outermost portion in the direction of rotation of the fan, said fan being driven by a D.C. electric motor having a wound armature which rotates in a magnetic field provided by permanent magnets, said air inlet of said housing being connected to vehicle air inlet means positioned at the exterior of said vehicle so that forward motion of the vehicle causes air to be forced into said vehicle air inlet means, said outlet of said housing being arranged to deliver air into the passenger compartment of said vehicle.

References Cited

UNITED STATES PATENTS

| 2,529,362 | 11/1950 | Allen | 98—2.4 |
| 2,796,820 | 6/1957 | Moore | 98—2.4 |
| 3,105,431 | 10/1963 | Stratton | 98—2.4 |

FOREIGN PATENTS

| 997,509 | 7/1965 | Great Britain. |

MEYER PERLIN, *Primary Examiner.*